US007490508B2

(12) United States Patent
Canhoto et al.

(10) Patent No.: US 7,490,508 B2
(45) Date of Patent: Feb. 17, 2009

(54) BENCH SCALE APPARATUS TO MODEL AND DEVELOP BIOPHARMACEUTICAL CLEANING PROCEDURES

(75) Inventors: Alfredo J. Canhoto, Framingham, MA (US); Rod J. Azadan, Boston, MA (US); John Putnam, Littleton, MA (US); Michael Kreuze, Acton, MA (US); Brian Williams, New Hartford, NY (US); Kristen Nobles, Somerville, MA (US); Jeff Chapman, Weare, RI (US); Kelli Barrett, Providence, RI (US)

(73) Assignee: Wyeth Research Ireland Limited, County Kildare (IE)

( * ) Notice: Subject to any disclaimer, the term of this patent is extended or adjusted under 35 U.S.C. 154(b) by 153 days.

(21) Appl. No.: 11/248,966

(22) Filed: Oct. 12, 2005

(65) Prior Publication Data

US 2006/0117654 A1 Jun. 8, 2006

Related U.S. Application Data

(60) Provisional application No. 60/618,554, filed on Oct. 12, 2004.

(51) Int. Cl.
*G01N 37/00* (2006.01)
*B08B 3/08* (2006.01)

(52) U.S. Cl. ........................ 73/60.11; 134/18; 134/108; 134/113

(58) Field of Classification Search ................ 73/60.11; 134/18, 108, 113, 135
See application file for complete search history.

(56) References Cited

U.S. PATENT DOCUMENTS 4,277,290 A * 7/1981 Andrews et al. .............. 134/10
5,039,349 A * 8/1991 Schoeppel ................... 134/26
2004/0194810 A1* 10/2004 Strothoff et al. ........... 134/25.2

OTHER PUBLICATIONS

Canhoto, "A Novel Bench Scale Apparatus to Model and Develop Biopharmaceutical-Cleaning Procedures", *Journal of Validation Technology*, 11(1): 16-24, 2004.
Canhoto, "A Semi-Quantitative Matrix for Selecting an Appropriate Cleaning Validation "Worst-Case" Challenge Soiling Solution", *Journal of Validation Technology*, 11(1): 6-15, 2004.
Rousseau, "How to solve complex cleaning validation problems", *Journal of Validation Technology*, 4(1): 22-30, 1997.

* cited by examiner

*Primary Examiner*—Daniel S Larkin
(74) *Attorney, Agent, or Firm*—Margo H. Furman; Choate, Hall & Stewart LLP

(57) ABSTRACT

An apparatus for testing a cleaning procedure for a material. The apparatus includes a rack having a seat configured to retain a plurality of test coupons at a predetermined angle, an upper tray that distributes a solution along the lines of the rack, a lower tray for receiving solution passed over coupons disposed on the rack, a meter that gauges a flow rate of the solution, a thermostatic heater adapted to bring the solution to a predetermined temperature, and a variable speed pump that directs the solution from a reservoir to the upper tray.

35 Claims, 11 Drawing Sheets

FIG.5

| Soil | Materials Of Construction | | | | | | | | | | | | | | | |
|---|---|---|---|---|---|---|---|---|---|---|---|---|---|---|---|---|
| | SS | | | | Glass | | | | EPDM | | | | Silicone | | | |
| | Avg Time (sec) | Std Dev | Avg TOC (ppm) | Std Dev | Avg Time (sec) | Std Dev | Avg TOC (ppm) | Std Dev | Avg Time (sec) | Std Dev | Avg TOC (ppm) | Std Dev | Avg Time (sec) | Std Dev | Avg TOC (ppm) | Std Dev |
| High Component/High Concentration Media | 433 | 15 | 0.1 | 0 | 118 | 7 | 0.2 | 0.1 | 440 | 17 | 0.2 | 0 | 780 | 0 | 2.0 | 0 |
| Cleaning Cycles Used: | AB | | | | A | | | | AB | | | | ABC | | | |
| Low Component/Low Concentration Media | 5 | 2 | 0.1 | 0.1 | 4 | 0 | 0.1 | 0 | 12 | 3 | 0.1 | 0 | 14 | 0 | 0.1 | 0 |
| Cleaning Cycles Used: | A | | | | A | | | | A | | | | A | | | |
| Low Component Buffer Containing a Highly Hydrophobic Component | 1110 | 0 | 0.2 | 0 | 380 | 18 | 0.2 | 0 | 1500+ | N/A | 6.1 | 2.1 | 1500+ | N/A | 0.9 | 0.3 |
| Cleaning Cycles Used: | ABCD | | | | AB | | | | NVC-ABCDE | | | | NVC-ABCDE | | | |
| Low Component/High Concentration Buffer | 18 | 2 | 0.5 | 0.1 | 18 | 5 | 0.6 | 0.1 | 33 | 8 | 0.7 | 0.1 | 34 | 5 | 0.5 | 0.1 |
| Cleaning Cycles Used: | A | | | | A | | | | A | | | | A | | | |
| Low Component/Low Concentration Buffer | 5 | 0 | 0.1 | 0 | 4 | 0 | 0.1 | 0 | 14 | 1 | 0.1 | 0 | 27 | 6 | 0.1 | 0.1 |
| Cleaning Cycles Used: | A | | | | A | | | | A | | | | A | | | |
| Low Component/Low Concentration Buffer | 6 | 0 | 0.1 | 0 | 5 | 0 | 0.1 | 0 | 14 | 1 | 0.2 | 0.1 | 8 | 0 | 0.1 | 0.1 |
| Cleaning Cycles Used: | A | | | | A | | | | A | | | | A | | | |

| Soil | Materials Of Construction | | | | | | | | | | | | | | | |
|---|---|---|---|---|---|---|---|---|---|---|---|---|---|---|---|---|
| | Acrylic | | | | Teflon | | | | PolyPro | | | | PMP | | | |
| | Avg Time (sec) | Std Dev | Avg TOC (ppm) | Std Dev | Avg Time (sec) | Std Dev | Avg TOC (ppm) | Std Dev | Avg Time (sec) | Std Dev | Avg TOC (ppm) | Std Dev | Avg Time (sec) | Std Dev | Avg TOC (ppm) | Std Dev |
| High Component/High Concentration Media | 202 | 8 | 0.1 | 0.1 | 660 | 159 | 0.1 | 0 | 780 | 0 | 0.1 | 0.1 | 423 | 24 | 0.1 | 0.1 |
| Cleaning Cycles Used: | A | | | | replicate 1-AB, replicates 2&3-ABC | | | | ABC | | | | AB | | | |
| Low Component/Low Concentration Media | 12 | 11 | 0.1 | 0 | 23 | 3 | 0.1 | 0 | 22 | 3 | 0.2 | 0.1 | 16 | 1 | 0.1 | 0 |
| Cleaning Cycles Used: | A | | | | A | | | | A | | | | A | | | |
| Low Component Buffer Containing a Highly Hydrophobic Component | 270 | 52 | 0.1 | 0.1 | 755 | 17 | 0.2 | 0.1 | 1140 | 0 | 0.1 | 0 | 1500 | 0 | 0.5 | 0.4 |
| Cleaning Cycles Used: | replicates 1&2-A, replicates 3-AB | | | | ABC | | | | ABCDE | | | | ABCDE | | | |
| Low Component/High Concentration Buffer | 27 | 9 | 0.8 | 0.8 | 27 | 4 | 0.3 | 0.1 | 21 | 14 | 1.5 | 2.1 | 30 | 8 | 0.1 | 0 |
| Cleaning Cycles Used: | A | | | | A | | | | A | | | | A | | | |
| Low Component/Low Concentration Buffer | 7 | 3 | 0.1 | 0 | 9 | 2 | 0.1 | 0 | 11 | 1 | 0.1 | 0 | 24 | 6 | 0.1 | 0 |
| Cleaning Cycles Used: | A | | | | A | | | | A | | | | A | | | |
| Low Component/Low Concentration Buffer | 6 | 0 | 0.1 | 0 | 5 | 0 | 0.1 | 0 | 8 | 0 | 0.1 | 0 | 10 | 2 | 0.1 | 0 |
| Cleaning Cycles Used: | A | | | | A | | | | A | | | | A | | | |

FIG.6

Component Categories and Common Examples of Each

| Acids or Bases | Monovalent Salts | Polyvalent Salts | Amino Acids | | Protein | Carbohydrates | Aqueous Soluble Organics | | Non Aqueous Soluble Organics |
|---|---|---|---|---|---|---|---|---|---|
| Acetic Acid | Sodium Chloride | Calcium Chloride | arginine | glycine | Bovine Serum Albumin | Sucrose | SDS | HEPES | Dimethicone |
| Hydrochloric Acid | Cuprous Sulfate | Magnesium Chloride | asparagines | histidine | Alprotinin | Dextran Sulfate | ethylene glycol | Methotrexate | Putrescine |
| Sodium Hydroxide | Sodium Bicarbonate | Magnesium Sulfate | cystine | leucine | Insulin | Glucose | propylene glycol | EDTA | Hydrocortisone |
| Potassium Hydroxide | Potassium Phosphate | Aluminum Sulfate | glutamic acid | proline | | | Tris (base or acid) | Imidazole | |
| Ammonia | Potassium Chloride | Cupric Sulfate | glutamine | serine | | | Sodium Acetate | Polyvinyl Alcohol | |
| Phosphoric Acid | Sodium Selenite | Ferrous Sulfate | valine | tryptophan | | | MES | Polysorbate 80 | |

BENCH SCALE APPARATUS TO MODEL AND DEVELOP BIOPHARMACEUTICAL CLEANING PROCEDURES

This application claims the priority of U.S. Provisional Application No. 60/618,554, filed Oct. 12, 2004, the entire contents of which are incorporated herein by reference.

FIELD OF THE INVENTION

This invention pertains to the identification and evaluation of solutions for removing biopharmaceutical soil from materials.

BACKGROUND OF THE INVENTION

The proper development, modeling and improvement of biopharmaceutical cleaning procedures are often time-consuming and impractical when production equipment is otherwise in use. Laboratory studies on coupons of representative biopharmaceutical manufacturing materials of construction (MOC) have long been the model on which cleaning regimens have been tested. Coupons, in and of themselves, are adequate models of the surfaces that need to be cleaned. However, the cleaning procedures typically used on the coupons do not sufficiently exemplify the conditions and phases of a Cleaning-in-Place (CIP) cycle within a production vessel.

The generalized phases of CIP procedures are rinse, chemical wash, rinse. But in designing a cleaning cycle for new or not well-understood soiling solutions in biopharmaceutical manufacturing processes, the difficult questions concern the fundamental components of cleaning details. Regulatory agencies continually inquire about cleaning programs, requiring an immense expenditure of resources and capital by commercial biopharmaceutical companies simply to document cleaning procedures. An efficient method of expediting cleaning development, providing experimental justification of existing cleaning methodologies, and resolving new cleaning issues has been the use of laboratory or bench scale cleaning studies on small MOC coupons. These bench scale studies can be performed with relative ease and low cost, especially because they obviate halting the manufacturing process to allow use of the full-scale manufacturing equipment for development runs. Any stop in marketable production affects the bottom-line profitability that, in turn, allows other company operations to continue. When properly designed, bench scale studies may provide an excellent model for various elements of full scale cleaning qualifications. Some of the needs of bench scale studies include access to process soils or representative model soils and conservative but pertinent experimental design and cleaning process modeling.

Appropriate soil selection, accurate process modeling and robust experimental design are the three pillars of comprehensive cleaning cycle development. Of these, process modeling has been the least investigated as to its efficiency and effectiveness. Biopharmaceutical drug substances are often in short and expensive supply. For this reason the engineers and scientists in charge of formulating a cleaning regime have turned to small MOC coupons in an attempt to model the use of manufacturing cleaning chemicals and cleaning cycles. A cleaning process model should include an appropriate combination of contact time, temperature, chemistry and representative cleaning action. The first three components are often studied in a static soak or a mildly agitated environment. This is often referred to as a most conservative approach which, when scaled up, would allow for a margin of safety or robustness in the cleaning process. The problem with this approach is that the soaking method may inaccurately represent the ratio of cleaning solution to soil per surface area. Furthermore, static soaking does not accurately reproduce the representative sheeting or cascading action that interior surface vessels receive when CIP cleaning chemicals are introduced via devices such as spray balls and spray wands.

The pressure and flow rate at which rinsing and cleaning solutions contact a vessel surface can vary tremendously. There are instances where a piece of equipment is cleaned manually via an ambient temperature, static soak in a dilute cleaning solution. There are also instances where a piece of equipment to be cleaned is blasted with heated, high concentration chemicals at pressures of greater than twenty pounds per square inch and a flow rate greater than forty five liters per minute. These examples may be extremes, but cycle parameters should be tailored to the equipment, process and soil cleanability. When encountering a process solution for the first time, it may be difficult to determine suitable cleaning contact times, temperatures, chemical concentrations and external energies or action necessary to effectively and efficiently remove unwanted soil from manufacturing process equipment. These variables should be carefully considered and used in combination in order to achieve the level of cleaning necessary without taxing any variable to an extreme that may not be sustainable by the cleaning equipment, the equipment being cleaned or the resources of the manufacturer themselves. Intimate understanding of the cleaning dynamics specific to a piece of equipment is integral in the development of a robust and implementable cleaning cycle. However, since this can be a long and arduous process, a suitable model system is paramount in maximizing the feasibility of proper development by minimizing manufacturing equipment downtime.

The choice of a proper manufacturing solution, or soiling solution from the cleaning validation perspective, on which to conduct cleaning development studies may either be a rather simple issue of immediate need to validate the cleaning of a specific soil, or it may be a more complex issue that requires more discussion and scientific logic to determine. Choosing the appropriate and most challenging process soil to conduct cleaning validation in the biopharmaceutical industry has traditionally been a best guess decision process. In biotechnology processes where numerous culture media and purification buffers are the norm for manufacturing a single product, the choice of a cleaning validation "worst case" challenge soil is typically imprecise, or one of historical precedent without much scientific analysis. Validation engineers are often pressed for scientific justification concerning their choice of representative challenge soils, especially in multi-product facilities where the significance is multiplied by the number of different products. New biopharmaceutical manufacturing processes may be even more difficult to assess since there may be little empirical information regarding which solutions historically present the greatest cleaning challenge.

Validation engineers responsible for cleaning validation invariably find themselves faced with the daunting question, "What is your worst case soil?" The answer to this question is simple when one is dealing with a pre-existing piece of equipment that is dedicated to a single product at a single process step. In this instance, the answer is simply the soil currently being used in or contacting that piece of equipment. However, in the case of an established multi-product/multi-soil piece of equipment or new biopharmaceutical manufacturing processes, the choice of a worst case challenge soil poses more of a quandary.

The choices of a worst case soil for cleaning validation may be numerous, with a vast diversity of soiling solution components. While it may be preferable to validate the cleaning of every soil to enter that equipment, resources and time greatly limit the number of validation runs that can be realistically conducted. Furthermore, for new manufacturing processes situations, not all process solutions may be enumerated at the time the cleaning validation is performed. Additionally, to operate more efficiently, an increasing number of corporations are positioning themselves as multi-product facilities in order to minimize risk and optimize capacity utilization. This push toward economic efficiency drives the need for more robust and encompassing validation studies that will allow for timely product changeover events. Cleaning validation presents one area where, when carefully thought out, efficiencies may be gained.

The choice of a cleaning validation worst case challenge solution that covers numerous solutions from various products would mean only one soiling solution per protocol execution. Depending on the chemical composition and nature of the soil chosen, that validation may even cover the cleaning validation of future, as of yet, unknown process solutions and soils. As a result, it is desirable to have an improved method to determine and compare the theoretical cleaning feasibility, or "cleanability", of various process or equipment soiling streams for both single and multi-product biopharmaceutical facilities.

SUMMARY OF THE INVENTION

In one aspect, the invention is an apparatus for testing a cleaning procedure for a material. The apparatus includes a rack having a seat configured to retain a plurality of test coupons at a predetermined angle, an upper tray that distributes a solution along the length of the rack, a reservoir from which the solution is delivered to the upper tray, a lower tray for receiving solution passed over coupons disposed in the rack, a meter that gauges a flow rate of the solution, a thermostatic heater in thermal communication with the reservoir, and a variable speed pump that directs the solution from a reservoir to the upper tray.

The pump may be a centrifugal pump. The predetermined angle may be forty-five degrees. The apparatus may further include a plurality of reservoirs from which fluid is directed to the upper tray. The reservoir may be the lower tray. The rack may be adjustable to accommodate coupons of different heights.

In another aspect, the invention is a method of testing the cleaning procedure. The method comprises directing a first fluid at a predetermined temperature and flow rate over a plurality of test coupons simultaneously and recirculating the first fluid over the test coupons a predetermined number of times. The method may further include directing a second fluid at a predetermined temperature and flow rate over the plurality of test coupons simultaneously and recirculating the second fluid over the test coupons a predetermined number of times.

The method may further comprise disposing the plurality of test coupons at a predetermined angle, for example, forty-five degrees, with respect to an incident fluid flow. The flow rate may be between about ten and about fifty LPM. The predetermined temperature may be between ambient temperature and about sixty degrees Celsius.

The cleaning procedure may be tested on a worst case soil selected from a plurality of predetermined soils. The worst case soil is selected by, for each of the predetermined soils, identifying the chemical nature and concentration of each component, assigning a value to each component describing its cleanability, and comparing the sum of the values for each soil. The soil having the highest sum is denoted the worst case soil. The method may further include classifying soils as buffers or media. The buffer having the highest sum is then denoted the worst case buffer soil, and the media having the highest sum is denoted the worst case media. The value assigned to the components may be an integer.

The components may be classified as acids, bases, monovalent salts, divalent salts, amino acids, proteins, carbohydrates, aqueous soluble organics, or non-aqueous soluble organics. Assigning a value to each component may include assigning a component factor to each component and multiplying the component factor by a predetermined multiplier based on the concentration of the component in the soil. The multiplier may be an integer. The methods may further comprise assigning a value to the soil based on its pH.

BRIEF DESCRIPTION OF THE DRAWING

The invention is described with reference to the several figures of the drawing, in which.

FIG. 5 is a table indicating the average cleaning time and average swabbed TOC results for a set of process soils on a set of materials of construction.

FIG. 6 is a table indicating common examples of components in several categories.

DETAILED DESCRIPTION OF CERTAIN PREFERRED EMBODIMENTS

In an effort to more closely model the delivery of cleaning solutions onto coupons of representative MOC and to aid in the development and testing of various biopharmaceutical cleaning procedures at the laboratory scale, a bench top cleaning apparatus was designed, built and implemented. This bench top cleaning apparatus delivers any cleaning solution via either a circulated or once through sheeting action flow over MOC coupons. The apparatus may be constructed of 316L stainless steel and outfitted with a small, variable speed, centrifugal pump and dual heating elements. With these integrated features, any laboratory can model, develop and improve large-scale manufacturing cleaning procedures by examining the four fundamental components of cleaning: contact time, temperature, chemistry and mechanical action. Furthermore, the cleaning feasibility, or 'cleanability', of specific process solutions (i.e. soils) may be assessed on this bench top apparatus, which may be advantageously coupled with the semi-quantitative matrix technique discussed below to verify cleaning validation challenge soil selections.

The small, bench-top apparatus was designed to mimic the cascading action of a spray-delivered cleaning agent to any material of construction coupon. This apparatus, coined "Last$_2$Rinse", may also include controls for contact time, temperature and multiple cleaning agents, thereby providing an ideal model system to mimic manufacturing equipment cleaning conditions in a laboratory setting. This apparatus may be constructed with dimensions that allow it to sit on a laboratory bench. A two-tray setup connected by a pump, for example, a one-eighth horsepower, stainless steel sanitary head centrifugal pump, can circulate or deliver once through (single-pass) cleaning chemicals over an MOC coupon. One skilled in the art will recognize that the materials and equipment from which the system is constructed may be varied if appropriate for different soils and/or MOC.

Figure 1A:
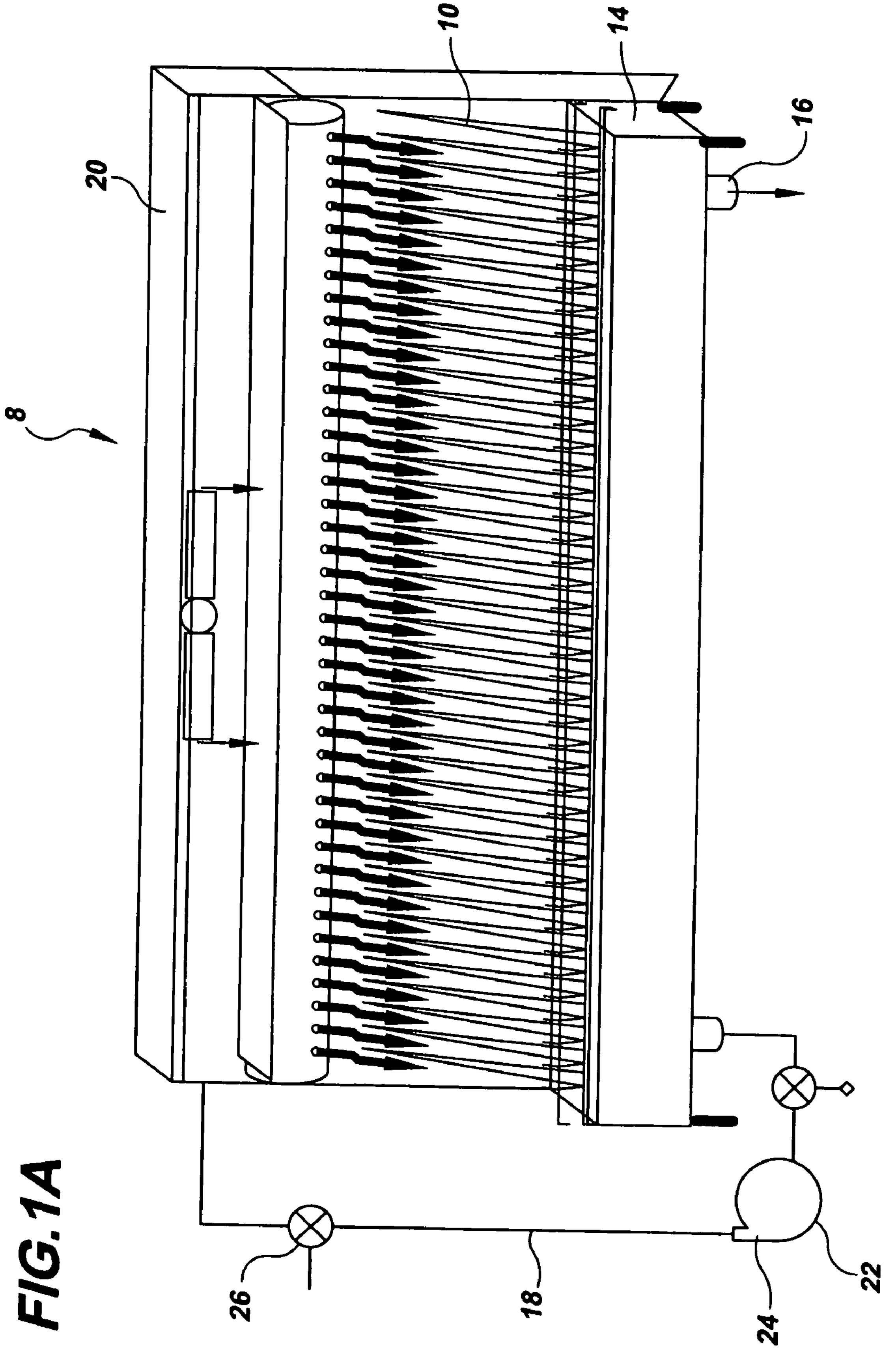
FIG. 1A is a schematic diagram of an apparatus according to an embodiment of the invention.
Figure 1B:
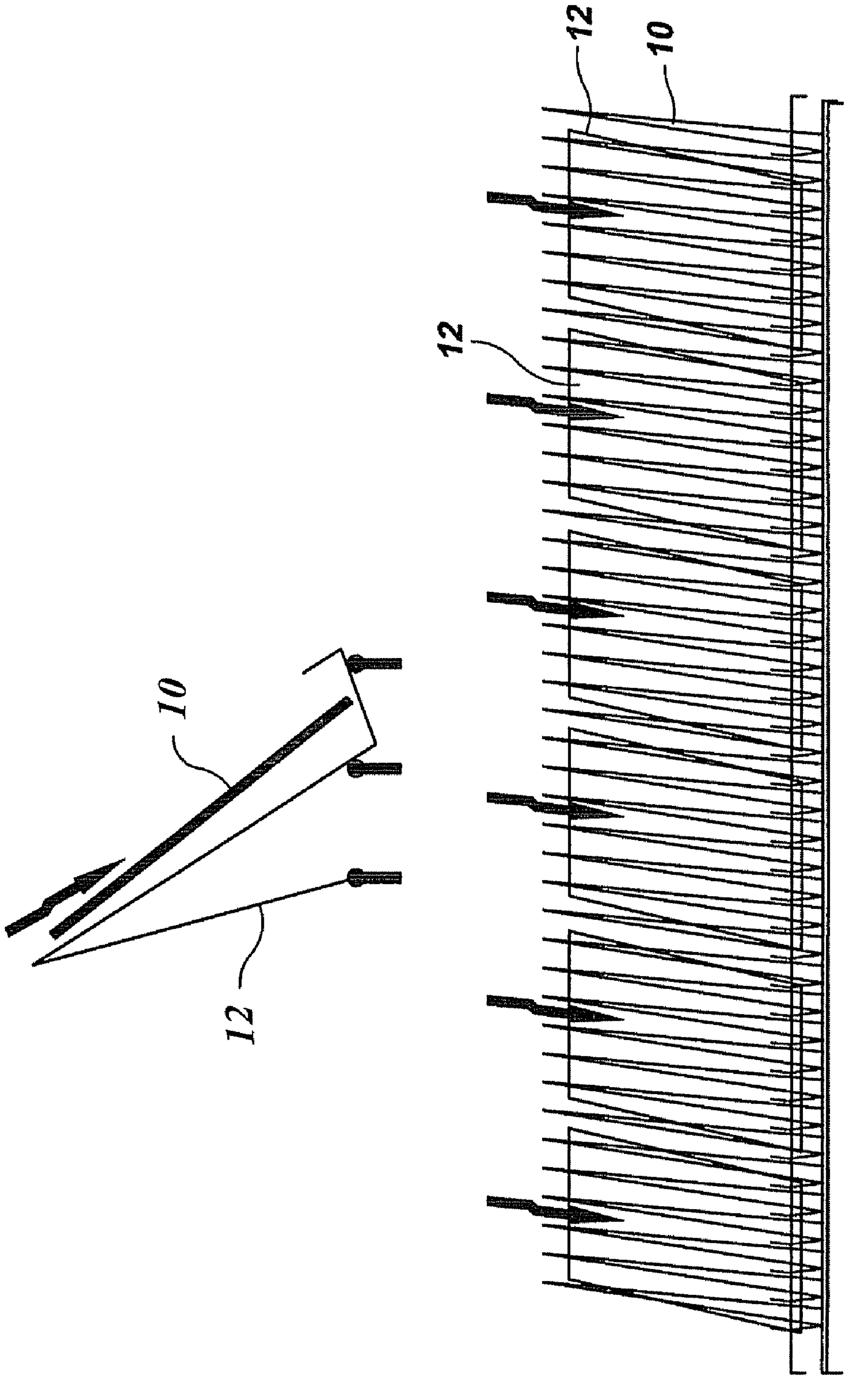
FIG. 1B is a schematic view of a portion of the apparatus in FIG. 1A, showing test coupons resting in the apparatus.
Figure 2:
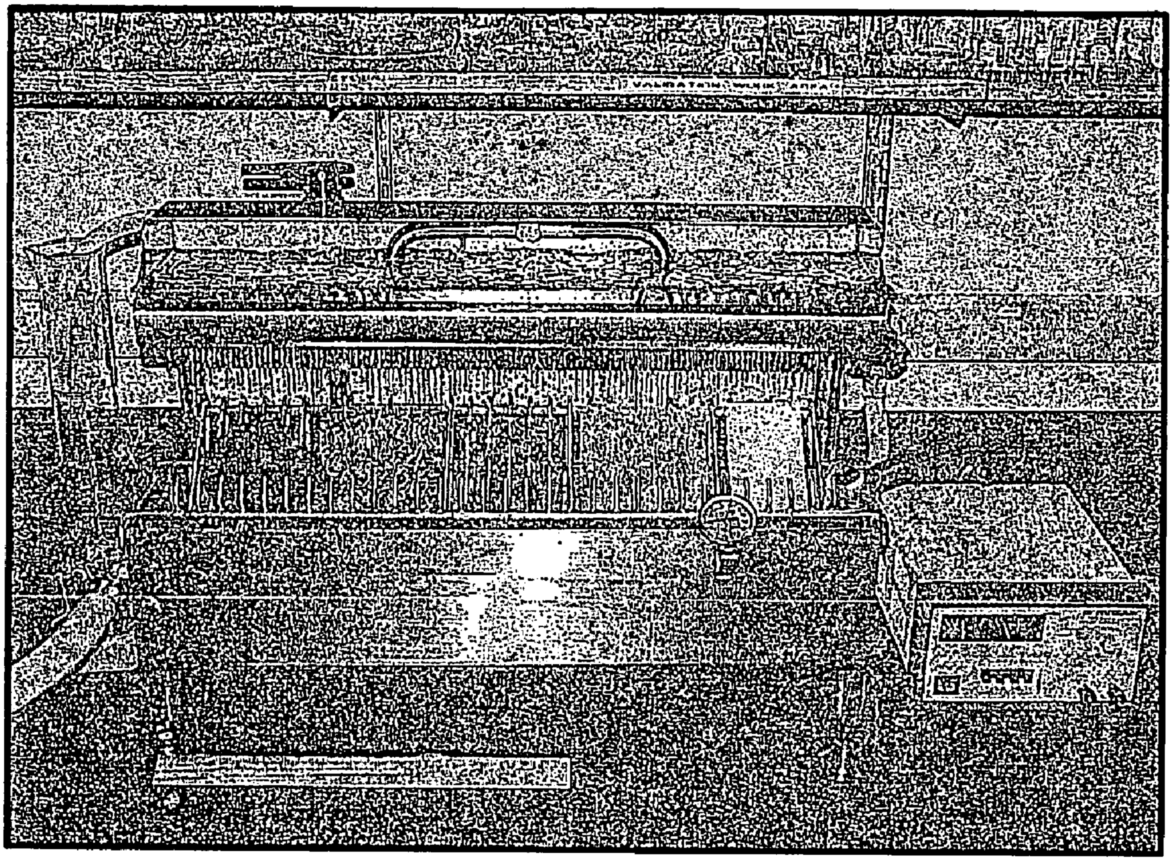
FIG. 2 is a photograph of an apparatus according to an embodiment of the invention.
Figure 3A:
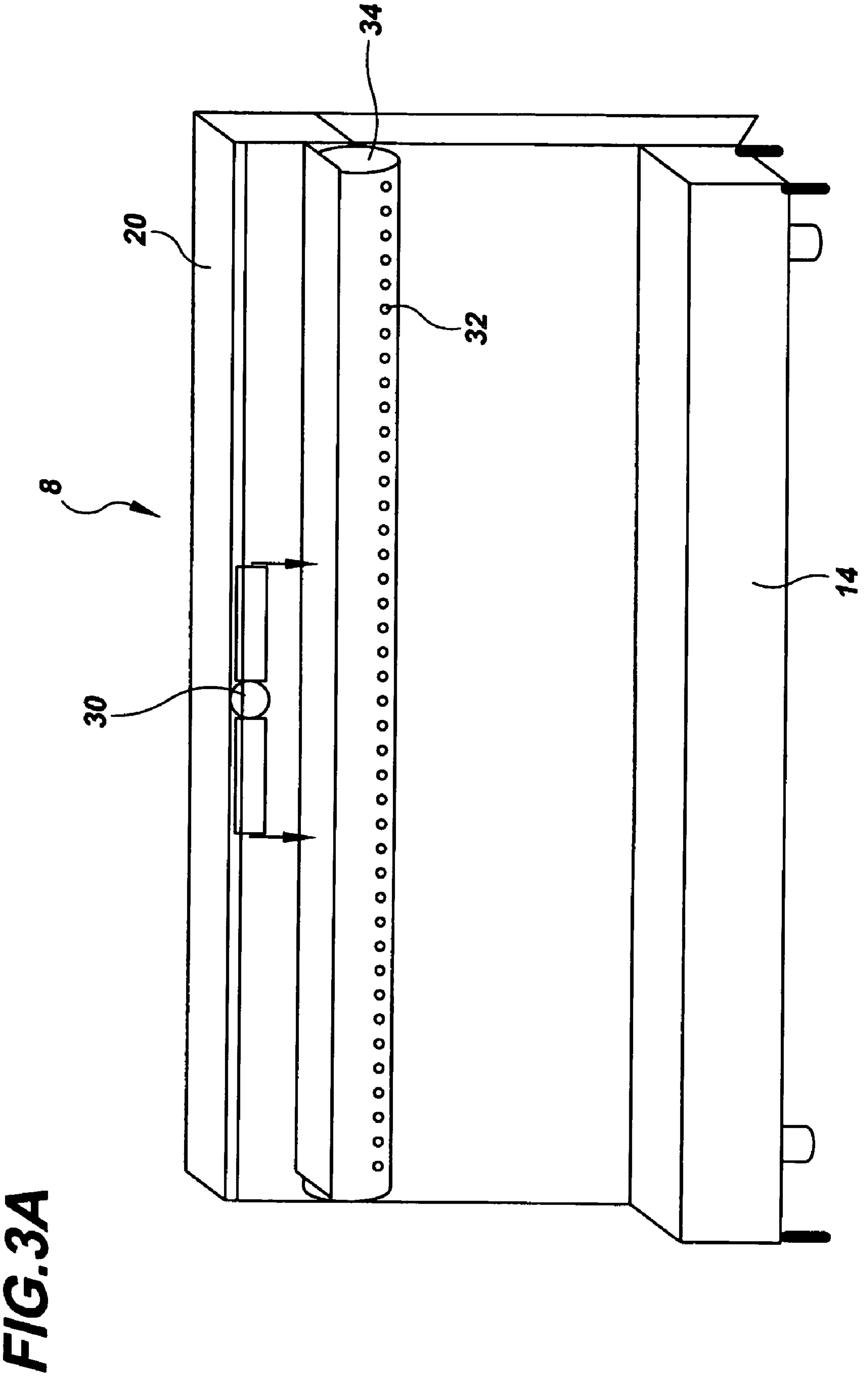
FIG. 3A is a schematic diagram of a portion of the apparatus shown in FIG. 1A.
Figure 3B:
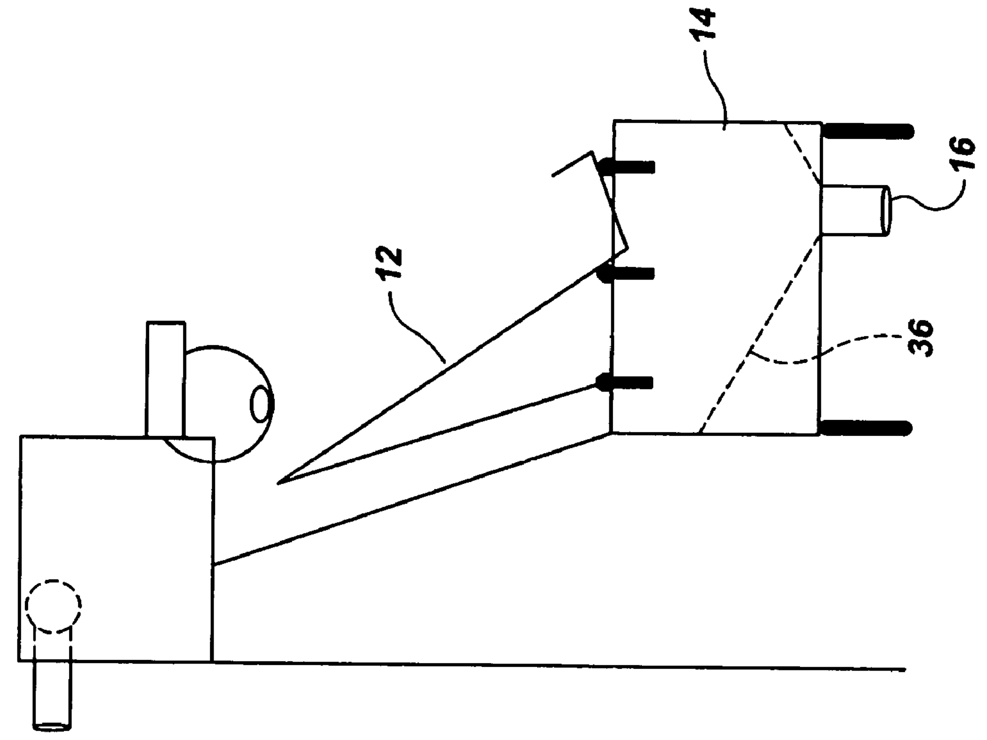
FIG. 3B is a side view of the apparatus depicted in FIG. 1A.

FIG. 1A provides a simple schematic of an exemplary apparatus 8 with arrows showing the delivery of cleaning solution over a representation of coupons 10. A prototype of this apparatus has been constructed and is currently in use for various cleaning studies. FIG. 2 is a digital photograph of this apparatus at work rinsing multiple representative MOC coupons used in biopharmaceutical manufacturing. In the embodiment shown in FIG. 1, the coupons 10 sit on a wire rack, or "chair" 12, angled at forty-five degrees from horizontal without disrupting the flow of the cleaning solution back into lower tray 14. FIG. 1B is a front view of the coupons 10 resting in chair 12. One skilled in the art will recognize that chair 12 may be configured to retain coupons 10 at a larger or smaller angle to adjust the flow characteristics of the cleaning solution. Cleaning solution in lower tray 14 is directed to either a drain 16 or via a return 18 to upper flow-over tray 20 using pump 22. A power supply, e.g., DC regulated power supply 24, controls the speed of the pump 22 and thereby controls the flow rate of the cleaning solution over the coupons 10. A diversion valve 26 in line from the pump to the upper flow-over tray allows an accurate and rapid measure of solution flow-rate, which can be used to easily calculate the flow-rate per unit surface area of a coupon material.

FIG. 3 is a series of schematic diagrams of various portions of the apparatus 8. Upper tray 20 may be charged with a cleaning solution using diverter 30, which helps deliver fluid evenly to upper tray 20. Fluid is directed from upper tray 20 over the coupons 10 though holes 32 in manifold 34, further distributing the flow of cleaning solution evenly along the length of the tray. After flowing over coupons 10, the cleaning solution flows into lower tray 14. Solution may be recirculated from tray 14 to upper tray 20 and redistributed over coupons 10. Lower tray 14 may have a large capacity, for example, about twelve liters or more, to accommodate the solution. One skilled in the art will realize that the capacity of lower tray 14 is adjustable. The apparatus may simply be produced with smaller or larger trays, or the tray itself may be replaced with a larger or smaller tray. FIG. 3B shows a side view of the apparatus 8, now including chair 12. The figure shows how the holes 32 are disposed above chair 12 to deliver fluid to a coupon 10 resting in chair 12. The figure also illustrates that lower tray 14 may have a contoured bottom portion 36 to facilitate complete emptying of lower tray 14 though drain 16 or return 18.

Figure 3C:
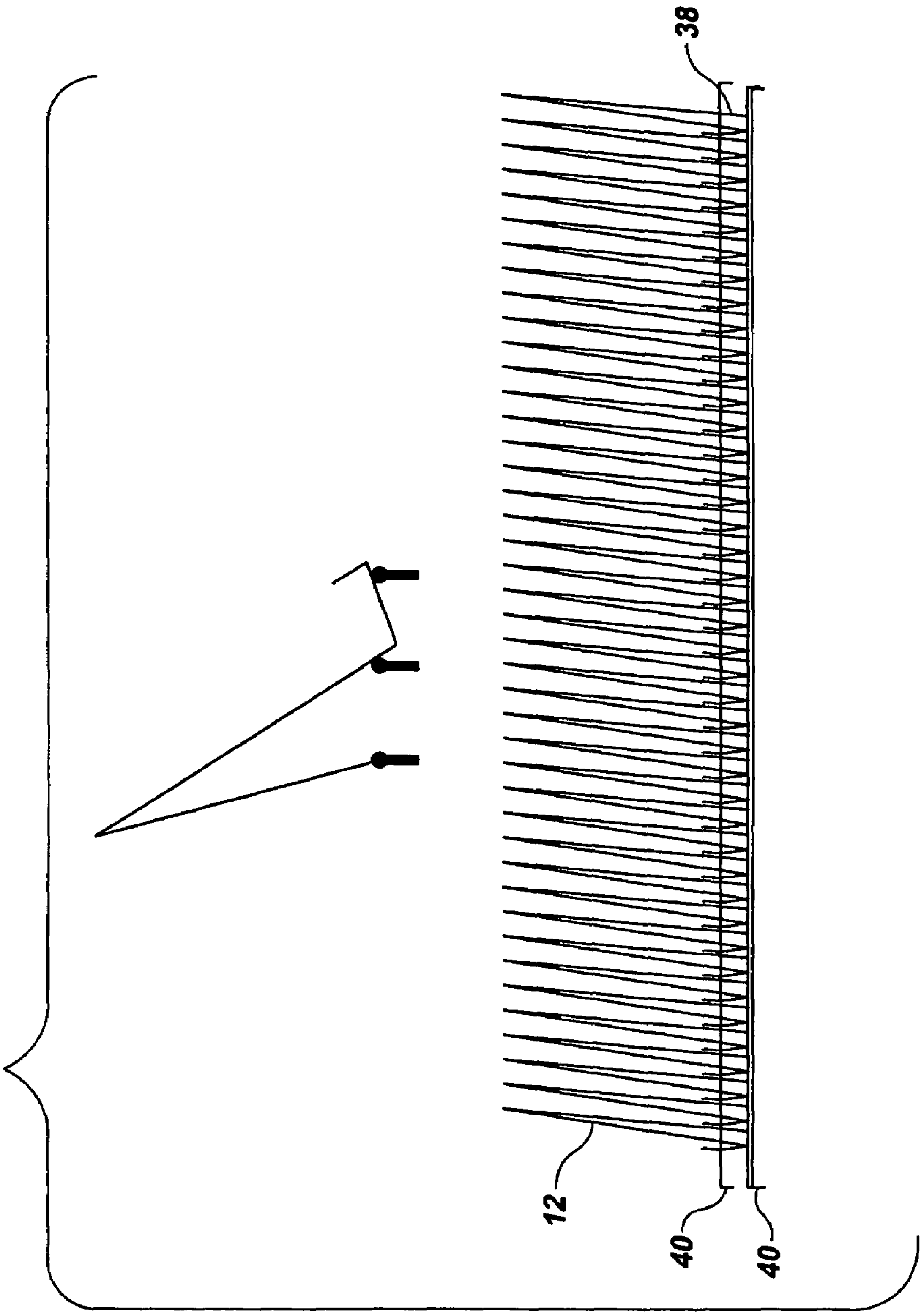
FIG. 3C is a front view of a portion of the apparatus depicted in FIG. 1A.
Figure 3D:
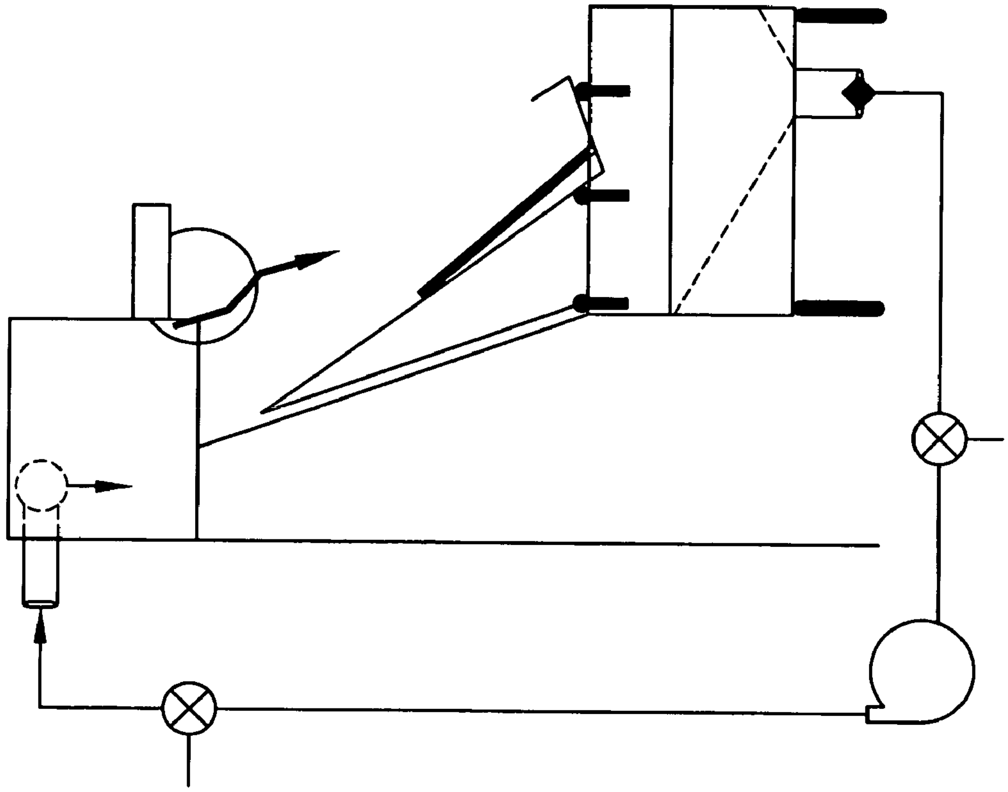
FIGS. 3D and 3E are side views of the apparatus depicted in FIG. 1A, illustrating how the apparatus may be adjusted to accommodate test coupons of different sizes.
Figure 3E:
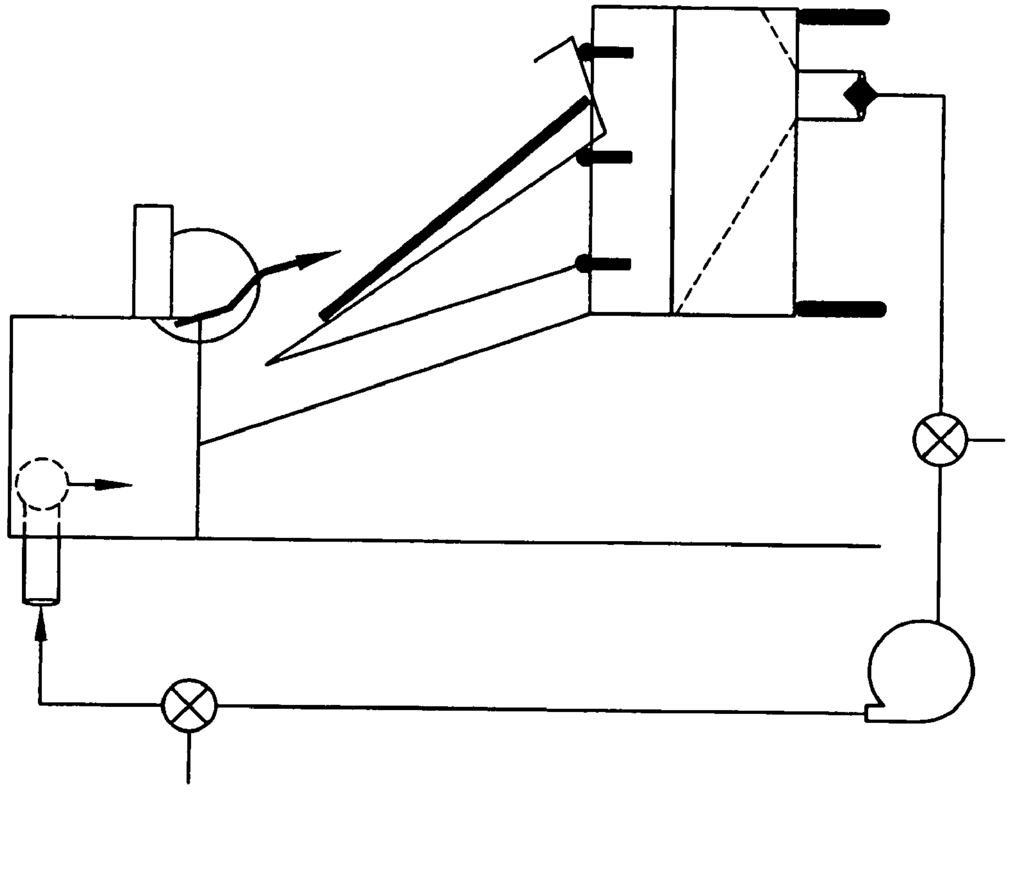

FIG. 3C is a schematic view of chair 12. In one embodiment, chair 12 is supported over lower tray 14 by three rails 40. The rear portion of chair 12 may be attached to the rear rail. A seat portion 38 may simply rest on the front two rails 40 or may be attached thereto. The rails may be moved to adjust the angle of the coupons 10 with respect to vertical. As shown in FIGS. 3D and 3E, chair 12 may be moved closer or farther from the front of the lower tray 14 by moving rails 40 to optimize fluid flow across smaller or larger coupons.

Figure 4A:
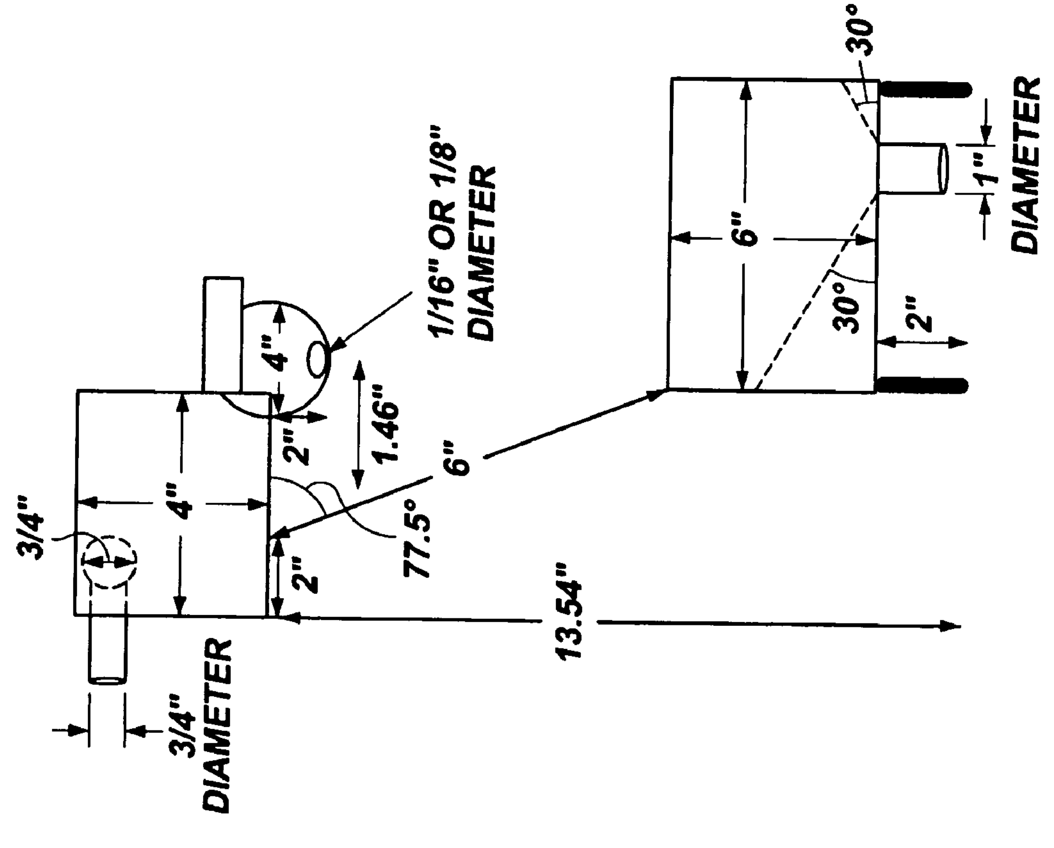
FIGS. 4A-B are schematic diagrams of an apparatus according to an embodiment of the invention, including exemplary dimensions for various features of the apparatus.
Figure 4B:
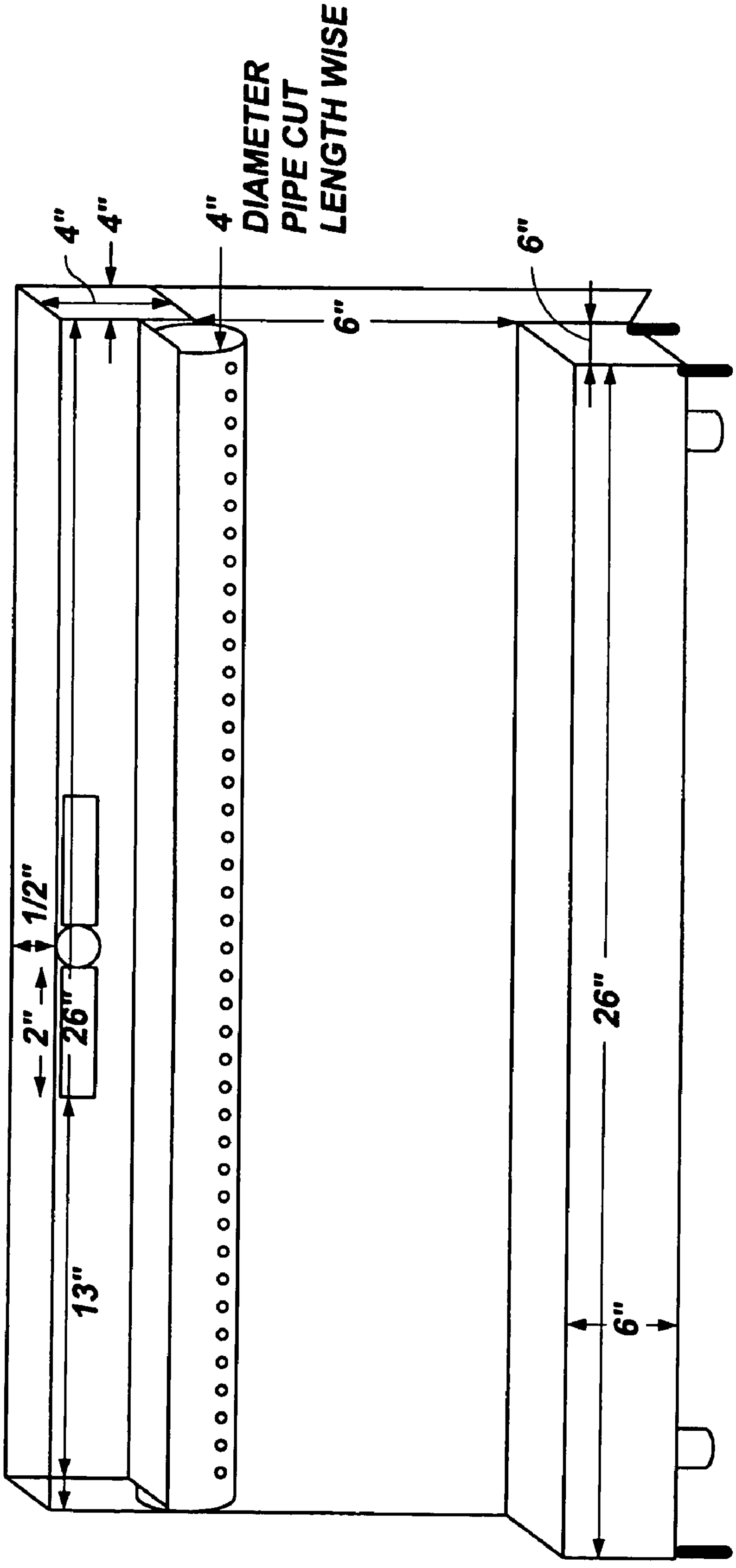

FIGS. 4A-4B include exemplary dimensions for various portions of apparatus 8. These proportions allow the apparatus 8 to fit on a laboratory bench. For example, an apparatus twenty-six inches in length can be used to test several coupons at a time without taking up excessive space. One skilled in the art will recognize that the apparatus 8 may be constructed with smaller or larger dimensions depending on the number and size of coupons being cleaned and the space available. For example, it may be desirable to use a longer apparatus to accommodate more coupons in a single test run. Where a longer apparatus is employed, it may be desirable to deliver the cleaning solution via more than one diverter 30 to promote even distribution of the solution across the coupons.

Flow rates as low as about ten liters per minute (LPM) or less to greater than about fifty LPM allow for a broad range in cleaning solution delivery. Slower or faster flows may be achieved using appropriate pumps. Because the cleaning solution may be recirculated from the lower tray, any amount of contact time of the cleaning solution on the coupons can be achieved by repeated recirculation of the cleaning solution. Furthermore, two heaters, for example, potentiometer controlled, thermostatic, stainless steel heaters may be mounted to either side of the lower tray to control the temperature of the cleaning solution between ambient room temperature to well above sixty degrees Centigrade (° C.). The cleaning solution may also be drawn from one or more external reservoirs, and these reservoirs may be heated as well. Combinations of once-though rinses, followed by chemical recirculation, then by purified water once-though rinses are easily achieved and very closely emulate the typical CIP cycles conducted in most biopharmaceutical manufacturing vessels.

An agreed upon acceptance criterion may be established to define a particular surface of a vessel as clean. The most widely accepted criterion, although usually coupled with a more quantitative assay such as testing for residual Total Organic Carbon (TOC), is that the surface be visually clean of any process soils. Although subjective, under good lighting and experienced examination, a visual inspection can be an appropriate indication of surface cleanliness. The corollary between coupons determined to be visually clean and the results of subsequent TOC (total organic carbon) testing in FIG. 5 suggests that visual inspection is a reliable and appropriate initial indicator of cleaning effectiveness. The bench-scale apparatus described in this article allows for excellent real-time examination of the MOC coupons as they are being cleaned and rinsed.

In addition to the qualitative assessment of visual cleanliness, instrument-based analytical techniques, such as TOC and conductivity analysis, have become the industry standard for gauging levels of residual after cleaning biopharmaceutical manufacturing equipment. However, a favorable result from any instrumental quantitative method of analysis, regardless of its level of detection, is superceded by any visual observation of an unclean area. Therefore, if any soiled coupon being rinsed on the apparatus is deemed visually unclean with a particular combination of cleaning chemical, temperature, contact time and flow, then the cleaning development must proceed to the next level of aggressiveness until the MOC coupon is satisfactorily clean by at least visual inspection. Once a method is developed that consistently results in visually clean coupons, the coupons may then be removed from the apparatus and swabbed for further residual analysis via methods such as the TOC analysis discussed above. This quantitative instrumental analysis can then be used to support the initial visual determination of cleanliness. Furthermore, since the apparatus allows for once through rinsing, in-line or grab samples may be taken for conductivity analysis or product specific assays.

Use of the $Last_2Rinse$ apparatus to model the cleaning of biopharmaceutical process equipment can facilitate product development and reduce costs. Bench scale studies can provide valuable information regarding CIP cycle and cleaning dynamics. The cascading delivery of cleaning solution, whether it is recirculated or once through, is an excellent model for full-scale CIP cleaning systems within manufacturing vessels. This small-scale apparatus has proven to be an easy and rapid tool to experiment with numerous permutations of the four fundamental components of cleaning: contact time, temperature, chemistry and mechanical action. Furthermore, data gathered from accurate process modeling can be immediately translated to production size vessels, providing significant cost savings resulting from the reduction of commercial drug substance manufacturing downtime.

As new biologic products and materials of construction are developed, the techniques of the invention may be used to test the cleanability of and cleaning methods for both soils and MOCs. Possible investigations that may be elegantly conducted on this bench-scale system include but are not limited to determining the cleanability of new biologic products with existing cleaning chemistries and cycles, the cleanability assessment of new materials of construction, the cross contamination retention from one material of construction surface to another, and the rapid evaluation of new cleaning chemicals and concentrations on existing products prior to the expenditure of full-scale performance qualification studies. The allure of such a simple rinse apparatus is that, without much resource investment, a multivariable question can be quickly studied and the solution easily applied in a system for which the cleaning dynamics closely emulate those found in full-scale production vessels.

It should be noted that there is great variability from soil to soil in the cleaning cycle aggressiveness necessary to achieve the minimum, visually clean, acceptance criteria. If the solutions used in this experiment soiled different equipment independently of one another, then the cleaning cycle approach for the different pieces of equipment could be the minimum cycle necessary to clean each piece of equipment. However, this approach necessitates cleaning cycles dependent on the soiling solution of that particular piece of equipment, which, in turn, necessitates cycle development and testing for every piece of equipment with each potential soil. A more conservative and efficient approach is that of validating a cleaning cycle that can clean all soils off of every material of construction with the appropriate cleaning chemistry, contact time, temperature and action necessary to repeatedly achieve the agreed upon cleaning acceptance criteria. This approach is commonly known as "worst case" challenge. Developing robust cleaning cycles using the most difficult to clean soiling solution is integral to this "worst case" challenge approach.

The challenges to selection of the worst case soil are the tremendous diversity of chemicals, concentrations and physical properties of the already numerous process solutions in use in the chemical and biopharmaceutical industry today. In many cases, the soil selected as the "worst case" is one that has been historically hard to clean. In other cases, a challenge solution with greatest number of constituent elements, or the solution with an outstandingly high concentration of a particular element may be chosen. While each is a valid determination of a challenging solution, these approaches do not take into consideration all aspects of a solution's cleaning challenge character, nor can they quantitatively compare different soils.

We have developed a simple matrix approach that assigns a numerical value based on the concentration of various components that have also been given a multiplication value based on their chemical characteristics, thereby providing scientific reasoning by which to choose a justifiable worst case challenge soil for cleaning validation evaluation.

Matrix approaches to cleaning validation problems are not unprecedented. An article in the *Journal of Validation Technology* by Pierre Rousseau, entitled "How to solve complex cleaning validation problems" (November 1997, Vol. 4, Num. 1., pgs. 22-30) suggests a matrix approach as a practical approach to deciding which product, swabbed equipment and location to consider worst case. The article also considers the cleaning difficulty and solubility variables but only assigns general categories to product types. The approach proposed herein differs from the approach by Rousseau in that a solution is deconstructed into component categories and concentrations with different weightings being given to solution components with proven resistance to aqueous based cleaning regimens.

A systematic matrix approach to the selection of a cleaning validation worst case challenge solution provides a more quantifiable method of selection. The quantitation of challenge soils should be based on all general chemical aspects of biological manufacturing solutions. The formulation records for process solutions typically itemize each and every component that must be cleaned form the process equipment. A complete list of all these manufacturing formulation records (MFR(s)) for each product in the manufacturing facility is collected and considered a potential soil. The formulation records are then be divided into two lists: buffering solutions (B) and culture media (CM), including the working titles of each record. Although solution components may be common to both, the general purpose and chemical composition of these two solutions are quite different. Buffers, used mostly in purification, are typically simple in composition with fairly high concentrations of individual components. Conversely, culture media are fairly complex in composition, often with no one particular component dominating any of the others in terms of concentration.

The solution compositions can be quite diverse, but general categories of components simplify a cleanability analysis. Solution components are typically subdivided into either soluble or insoluble in aqueous media. There are a few non-aqueous organics commonly used in the biopharmaceutical manufacturing process, for example, simethicone and hydrocortisone. However, most biopharmaceutical manufacturing components fall into the aqueous soluble group. The aqueous soluble group merits further subdivision for a more detailed cleanability assessment. These subgroups include acids and bases, mono- and polyvalent salts, amino acids, proteins (polypeptides), carbohydrates and other miscellaneous aqueous soluble organics such as Tris or EDTA. Examples of these categories may be found in FIG. 6, which is not intended to be all inclusive. These component categories present some variation in cleanability for reasons such as solubility, viscosity and chemical interaction. Although some characteristics of a solution, such as chemical interactions between its components, are not accounted for by such a structured evaluation, a cleanability assessment may weight the various groupings by their solubility and viscosity appropriately.

Although the negative log of the hydrogen ion concentration, or pH, of a solution is not included as a component category in FIG. 6, it is an attribute that may be taken into consideration for cleanability purposes. In situations where the pH of a solution reaches extremes, it may present an increased cleaning challenge, especially if it is not neutralized by the cleaning agents. However, since cleaning agents are often extreme pH solutions, the difficulty of cleaning extreme pH soils is certainly not as great as for other component categories such as proteins or non-aqueous organics.

The analysis of a solution may be incomplete if it does not account for the final concentration of a given component category. Therefore, a cleanability assessment may consider a solution's component concentration in ranges that encompass both extremely low and high ranges and weights them accordingly.

After the soil components have been cataloged and categorized, a two dimensional matrix is constructed with a vertical categorization of the subdivisions of the soil components (Component Categories). In addition, each Component Category has an associated cleaning challenge value (Component Factor), a simple numerical estimate based on physical and chemical characteristics, such as solubility and potential viscosity. Solubility may be measured in the labs or determined from references such as the Merck Index and the monograph *Cleaning and Cleaning Validation* (Brunkow, et al., 1996). Because the biopharmaceutical manufacturing process is typically aqueous, the more theoretically difficult a component is to dissolve, the more challenging the solution component category, and the higher the Component Factor. Likewise, if a component, for example, heat-treated carbohydrates (caramelized sugars), hinders free flow of cleaning and rinsing solutions or has the potential to do so, a higher Component Factor may be assigned. The Component Factor provides a reproducible quantitative value that correlates with the theoretical difficulty of cleaning a process solution or soil using current cleaning procedures. Of course, if a particular soil component is more difficult to clean in reality, the matrix may be adjusted by assigning that soil a higher Component Factor. This may be determined in side-by-side comparisons of the cleanability of different soils using a series of cleaning solutions of increasing or decreasing aggressiveness.

The concentration of each component may also be taken into consideration. The horizontal axis of the matrix depicts concentration level variations of the Component Categories (Concentration Dependent Multipliers). Units of grams per liter were used for concentration except to indicate pH. The value of the Concentration Dependent Multiplier increases with increasing concentration. In one embodiment, multipliers are whole number integers ranging from zero (0), for the absence of the component category representative in a solution to five (5), for solutions with the highest concentration of components in that category (or solution pH extremes). For certain biomanufacturing processes, the range of multipliers or concentration ranges to which they are assigned may need to be customized to appropriately bracket formulation concentrations.

As depicted in Table 1, *The Challenge Soil Semi-Quantitation Matrix*, the two soiling solution characteristics, Component Categories and Concentration Dependent Multipliers, are plotted in an X versus Y matrix with their corresponding component factors and multiplier values to the left or above their corresponding rows or columns.

TABLE 1

Challenge Soil Semi-Quantitation Matrix

| Component | | Concentration Dependent Multiplier | | | | | |
|---|---|---|---|---|---|---|---|
| Factor | Component Categories | 0 | 1 | 2 | 3 | 4 | 5 |
| CM | Complete Media | see additional components for remaining "Composition and Concentration" Quantitation | | | | | |
| B | Buffers and Non Medias | see additional components for remaining "Composition and Concentration" Quantitation | | | | | |
| 1 | pH | 6.5-7.5 | >7.5-≦9 & <6.5-≧5 | <5-≧4 & >9-≦10 | <4-≧3 & >10-≦11 | <3-≧2 & >11-≦12 | <2 or >12 |
| | Composition and Concentration | | | | | | |
| 2 | Acids or Bases | none | >0 g/L | ≧4 g/L | ≧20 g/L | ≧100 g/L | ≧500 g/L |
| 2 | Monovalent Salts | none | >0 g/L | ≧4 g/L | ≧20 g/L | ≧100 g/L | ≧500 g/L |
| 3 | Polyvalent Salts | none | >0 g/L | ≧4 g/L | ≧20 g/L | ≧100 g/L | ≧500 g/L |
| 2 | Amino Acids | none | >0 g/L | ≧2.5 g/L | ≧5 g/L | ≧10 g/L | ≧20 g/L |
| 3 | Protein | none | >0 g/L | ≧2.5 g/L | ≧5 g/L | ≧10 g/L | ≧20 g/L |
| 3 | Carbohydrates | none | >0 g/L | ≧4 g/L | ≧20 g/L | ≧100 g/L | ≧500 g/L |
| 2 | Aqueous Soluble Organics | none | >0 g/L | ≧4 g/L | ≧20 g/L | ≧100 g/L | ≧500 g/L |
| 4 | Non Aqueous Soluble Organics | none | >0 g/L | ≧2.5 g/L | ≧5 g/L | ≧10 g/L | ≧20 g/L TOTAL |

This matrix may be used to quantify any solution's component characteristics and concentrations. A simple low end integer scale provides simplicity of use. Multiplication of the horizontal and vertical numerical factors provides a cleaning difficulty factor for each component category.

When analyzing various soils, comparisons may be made within a given process or throughout an entire facility. Initially, it is recommended that all manufacturing records (MFRs) be compared simultaneously in order to ensure thoroughness. When a new MFR is added to a manufacturing process, it should be evaluated at that time via the proposed matrix in order to ascertain whether it poses a greater challenge than the current worst case soiling solution. The nature of the matrix allows the MFRs to be compared independent of the time of semi-quantitative analysis. As a result, re-evaluation of previously analyzed MFRs is unnecessary unless the formulation changes.

For each manufacturing record, each individual component is separated into its component category. In its most basic operation, (See Table 2, Example A) the concentration of a given Component Category is plotted. The Concentration Dependent Multiplier associated with that particular concentration is multiplied by the Component Factor for that given Component Category and the product entered in the right-most column of the matrix on the line corresponding to the appropriate Component Category. This step is repeated for each of the Component Categories under the "Composition and Concentration" portion of the matrix.

For manufacturing records that contain more than one component within a given component category (See Table 2, Example B), the concentration of those components are added and then the Component Factor value multiplied by the Concentration Dependent Multiplier of the summed concentration (total grams per liter) within that Component Category. That number is entered in the right-most column of the matrix on the line corresponding to the appropriate Component Category.

Note that culture media typically consist of a base composition (powder or liquid) and various supplements (See Table 2, Example C). Furthermore, culture media is often made and used at a fold-multiple. Therefore, this increase in individual component's concentrations should be calculated prior to determining which Concentration Dependent factor should be used as the Multiplier to the Component category Factor.

For example, when a basal preparation of media is prepared from commercially available powder or liquid form, it is often used at higher concentration multiples than the manufacturer initially developed. These medias are typically named with the multiple in their functional title (e.g., 2× feed media). Before the semi-quantitating analysis is performed on the media used in this fashion, recalculation of the basal media component concentration should be performed (See Table 2, Example D). Only once this multiple concentration is calculated should the supplemental components be considered.

TABLE 2

Examples of Some Simple Solution Matrix Quantitations

| Example | Description |
|---|---|
| A | Single monovalent sale containing soiling solution (e.g., 5.8 g/L NaCl)<br>Component Factor was 2 (monovalent salt)<br>Concentration Dependent Multiplier for 5.8 g/L was 2<br>The right most column had a 4 written in. |
| B | Triple monovalent salt containing soiling solution (e.g., 0.74 g/L KCl, 87 g/L NaCl &252 g/L CsCl)<br>Consolidated component concentration was (0.74 g/L + 87 g/L + 252 g/L =) 339.74 g/L Total<br>Component Factor for all was 2 (monovalent salt)<br>Concentration Dependant Multiplier for the 339.74 g/L was 4<br>Therefore the right most column had an 8 was written in. |
| C | Multiple component consolidation (e.g., 135 mg/L L-Isoleucine (in basal media powder) & 1.62 g/L L-Isoleucine (in media supplement))<br>Consolidated component concentration was 1.76 g/L<br>Component Factor was 2 (amino acid)<br>Concentration Dependent Multiplier for the 1.76 g/L was 1<br>Therefore the right most column had a 2 written in. |
| D | Multiples of Media recalculation and consolidation (e.g., 8X media containing 270 mg/L L-Isoleucine (in basal media powder) & 1.62 g/L L-Isoleucine (in media supplement))<br>Multiply basal component by fold usage (e.g. 8x 0.270 g/L) to 2.16 g/L<br>Consolidate component concentrations to (2.16 g/L + 1.62 g/L =) 3.78 g/L Total<br>Component Factor was 2 (amino acid)<br>Concentration Dependant Multiplier for the 3.78 g/L was 2<br>Therefore-the right most column had a 4 written in. |

The supplemental components are often enhanced concentrations of components also found in the basal media powder. Analysis of basal culture media and supplements should be conducted in order to consolidate identical basal components and supplements into one total concentration. Only after the component consolidation is complete should the quantitation analysis of all components be conducted as described.

Only after every solution component has been considered and Component Factor/Concentration Dependent Multiplier values determined, all resulting numerical values in the right most column of the matrix are added together for each solution and that number placed in the "Total" (lower-right most) box. This value, called the Total Matrix Value, is the numerical value correlating with a particular solution's cleaning difficulty or cleanability. This value is labeled culture media (CM) or buffer (B) plus the sum of the Component Factor/Concentration Dependent Multiplier values.

It is suggested that, for facilities that are conducting this analysis on an existing product's set of manufacturing solutions to determine the soil with the greatest cleaning challenge, or highest Total Matrix Value, that a list be made of formulation record numbers, titles and corresponding Total Matrix Values. When this procedure is repeated for each process soiling solution, a hierarchical list will ultimately reveal the solution posing the worst case cleaning challenge.

The matrix semi-quantitation approach provides a systematic method for identifying which soils pose the greatest cleaning challenge, either within one product's manufacturing process or across multiple products' manufacturing processes. One may select the appropriate test soil to serve as a worst case cleaning challenge soil for process qualifications in several ways. The most applicable test soil may be the soil with the highest Total Matrix Value overall, the highest Total Matrix Value per product or even the highest Total Matrix Value per manufacturing area. In each case, the matrix provides a scientifically justifiable analysis of potential challenge soiling solutions.

Constructing a hierarchical list of possible worst case challenge soiling solutions is recommended for use in CIP qualifications. All formulated manufacturing solutions should be listed. Besides the overall worst case challenge soiling solutions, the formulation records may be subcategorized into product specific and either buffer or media specific records depending on the requirements of the cleaning study in question. The formulation records with the greatest Total Matrix Value listed may serve as a good soiling solution in a cleaning qualification on at least non-product contact production support equipment. It may not be desirable to include product-containing soiling streams in the challenge soil matrix analysis due to the highly individualistic biochemical nature of biopharmaceutical products. Alternatively, it may be desirable to evaluate the products or product-containing streams separately.

Although the matrix analysis approach proposed associates values with various groups of chemicals, it may not be appropriate to quantify all chemical categories, properties or interactions. Therefore, the matrix is termed "semi"-quantitative. The term "semi" is intended to allow those skilled in the art to modify the Component Factor values or the Concentration Dependent Multipliers as they see fit to meet their scientific judgment or purposes. Furthermore, some biopharmaceutical manufacturing processes may possibly employ solution components falling outside the categories discussed above. Although not frequently encountered, other types of components that may be considered and added to the Component Categories include without limitation:

Strong Oxidizing or Reducing Agents

Metal compounds above trace (>1 g/L or 0.1 M) levels

Compounds with extremely high viscosities (e.g., ≧10 centiPoise)

Compounds that are extremely toxic or reactive in nature

The above list is not intended to be all-inclusive or even to suggest that these types of compounds cannot be successfully cleaned from manufacturing equipment, but it is intended to point out components that may merit more extensive cleaning considerations on a case-by-case basis. Although uncommon in biopharmaceutical manufacturing solutions, it is suggested that if unusual components were present, then an individual evaluation via scalable bench studies on coupons representative of materials of construction used in the manufacturing process may be desirable. Alternatively or in addition, bench studies may be used to generate Component Factor values for additional soils. For example, a soil that is more difficult to clean than a non-soluble organic may be assigned a Component Factor of 5.

This matrix approach may be applied when necessary to address both the introduction of new soils and changes to existing manufacturing formulation records that have already been evaluated. In such a scenario, a scientific comparison study may be warranted to functionally compare cleanability of two solutions, including those scoring equivalently on the Total Matrix Value. Furthermore, this matrix analysis does not take into consideration the soiling effects of whole cell culture and bulk drug substance. Product-containing soiling solutions may be addressed individually with scalable bench studies including swabbing and limit of detection assays or ultimately in an actual CIP performance qualification.

EXAMPLES

Example 1

The $Last_2Rinse$ was implemented to investigate the cleanability of various soils from several commonly used MOC coupons: Stainless Steel (SS), Glass, Polymethylpentene (PMP), Silicone, Acrylic, TEFLON (polvtetrafluorethvlene), Polypropylene (PolyPro), and Ethylene-Propylene-Diene Monomer (EPDM). Triplicate coupons of these MOC were soiled with 1 ml of six different soiling solutions. These soiling solutions were allowed to dry on the coupons for eight hours in an incubator at 37° C. To clean the MOC coupons, five cleaning cycles, A though E, were implemented (Table 3). Coupons were exposed to a maximum of 300 seconds of each cleaning cycle; each cycle was more aggressive than the previous one. A calibrated stopwatch was used to time the cycles. When coupons were visually clean, they were removed from the apparatus and swabbed for residual TOC. If coupons were not deemed visually clean upon a completion of a 300 second cycle, they were exposed to the next most aggressive cleaning cycle. Coupons that were not visually clean (NVC) after exposure to all attempted cleaning cycles were labeled as such.

TABLE 3

Explanation of Cleaning Cycles Used

| Cycle | Explanation |
|---|---|
| A | Maximum of 300 seconds of ambient Purified Water (PW) once-through |
| B | Maximum of 300 seconds of ambient 0.1 N NaOH recirculated |
| C | Maximum of 300 seconds of 40° C. 0.1 N NaOH recirculated |
| D | Maximum of 300 seconds of 40° C. 1 N NaOH + (v/v) CIP Additive ™ (Steris Corporation) |
| E | Maximum of 300 seconds of 50° C. 0.5 N NaOH + 5% (v/v) CIP Additive ™ (Steris Corporation) |

Figure 7:
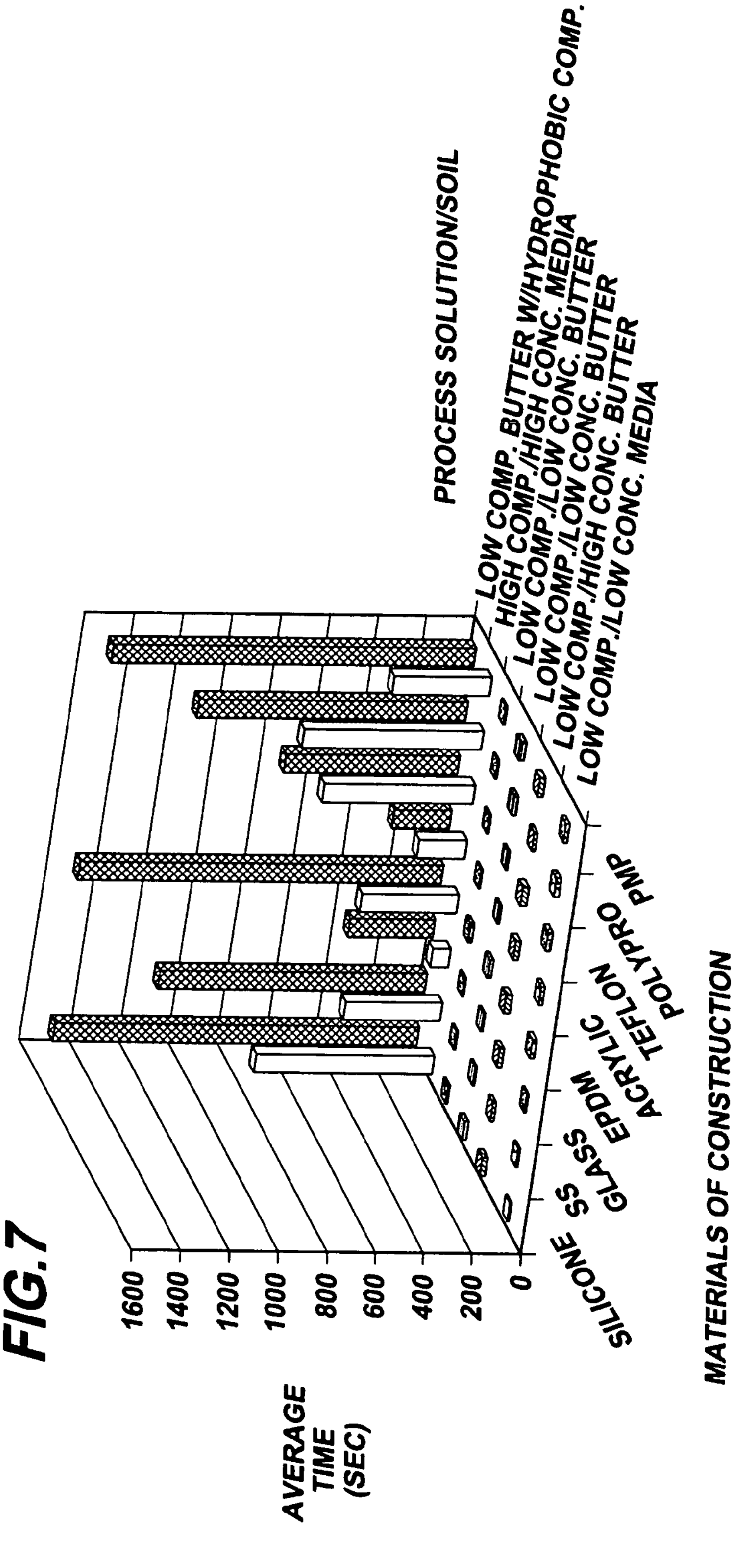
FIG. 7 is a graph showing the cleaning time required to achieve the visually clean standard for different soils and materials of construction.

Table 4 indicates the type of soils and the components in each of the soils that were used in the cleanability experiments. FIG. 5 tabulates the results of these soils, and shows cleaning cycle(s) used, average time until visually clean and swabbed TOC results, including standard deviations, at the point at which the coupons were deemed visually clean. FIG. 7 is a graphic representation of this data. It is interesting to note that while four of the six soiling solutions came clean with simple PW once though rinses, a fifth soiling solution did not clean off all the MOC coupons unless a 40° C. 0.1 N solution of sodium hydroxide was recirculated over the coupons. These experimental results indicate that an appropriate cleaning cycle for this soil would be no less than five minutes of water rinsing, followed by five to eight minutes of 40° C. 0.1 N sodium hydroxide. The sixth soiling solution did not come clean from all the MOC coupons after all of the cleaning cycles were used. More aggressive cleaning solutions may be tested on this particular soil to identify a cleaning protocol.

TABLE 4

List of Soils Used, With Their Corresponding Components and Total Matrix Values

| Soil Type | Components | Total Matrix Value |
|---|---|---|
| High component/High concentration media | Dry Power Complete Medium, plus additional components including: Polyvinyl Alcohol, Recombinant Insulin, Hydrocortisone, Potassium Selenite, Potassium Bicarbonate, D-Glucose, L-Glycine, Dextran Sulfate, L-Serine, L-Tryptophan, L-Cysteine, HCl, Ferrous Sulfate | 28 |
| Low component/Low concentration media | Sodium Phosphate Monobasic, Ammonium Sulfate, Calcium Sulfate, Potassium Citrate, Magnesium Chloride, Sodium Phosphate Dibasic, 10 N Sodium Hydroxide | 9 |
| Low component buffer with a highly hydrophobic component | 15% Ammonium Hydroxide, 1.8% Simethicone Antifoam | 24 |
| Low component/High concentration buffer | 200 mM Tris, 4.0 M NaCl, 0.50 M Arg-HCl, 10 N NaOH pH 6.80 | 28 |
| Low component/Low concentration buffer | 0.05 M Glycine | 6 |
| Low component/Low concentration buffer | 20 mM Tris, pH 8.00 | 3 |

Example 2

Empirical Assessment of "Worst Case" Challenge Soil Selections

The results in FIG. 5 also include an empirical demonstration of choosing a cleaning validation "worst case" challenge soiling solution. The soiling solutions in this experiment were chosen on the basis of component number, complexity, concentration, solubility and viscosity. These solutions were given a cleanability rating (i.e., Total Matrix Value) utilizing the semi-quantitation matrix approach described above (see Table 4). Table 5 summarizes the soil types investigated with respect to their total matrix value and observed cleaning times. The results clearly indicate that the low component buffer with a highly hydrophobic (non-aqueous organic) component took the longest time to come visually clean on any MOC surface. The high component/high concentration media was the next most difficult to clean, followed by the low component/high concentration buffer. The low component/low concentration buffer and low component/low concentration media soils had the fastest cleaning times. The classification of each coupon as visually clean was then confirmed in most cases by subsequent TOC analysis. These data show greater than 94% correlation between visually clean and a residual TOC of less than or equal to the conservative USP limits for purified water (0.5 parts per million (ppm)), which is the water used for the final rinse. These results closely mirror Total Matrix Values initially used to select these soils for practical experimentation.

TABLE 5

Summary of Soil Types With Their Respective Total Matrix Value and Cleaning Times

| Soil Type | Total Matrix Value | Min. Time Until Clean (sec) | Max Time Until Clean (sec) | Average Time Until Clean (sec) | Std Dev |
|---|---|---|---|---|---|
| High component/High concentration media | 28 | 110 | 780 | 446 | 229 |
| Low component/Low concentration media | 9 | 3 | 25 | 13 | 6 |
| Low component buffer with a highly hydrophobic component | 24 | 360 | 1500+ | 1022 | 494 |
| Low component/High concentration buffer | 28 | 14 | 62 | 29 | 10 |
| Low component/Low concentration buffer | 6 | 4 | 30 | 13 | 8 |
| Low component/Low concentration buffer | 3 | 5 | 20 | 9 | 4 |

Example 3

Sample Calculation of an Example Soil Using the Challenge Semi-Quantitation Matrix Buffer XYZ from "Acme" Buffer Suppliers has the following components:

| | |
|---|---|
| .020 M MES (2.62 g/L MES-acid + 1.45 g/L MES-base = 4.07 g/L) | Aqueous Soluble Organic |
| 0.020 M $CaCl_2$ (2.94 g/L) | Divalent Salt |
| 0.1% V-Tween-80 (1.0 mL/L × a density of 1.1 g/mL = 1.1 g/L) | Aqueous Soluble Organic |
| 1 M NaCl (58.4 g/L) | Monovalent Salt (58.4 g/L) |
| 0.020 M L-Histidine (3.1 g/L) | Amino Acid (3.1 g/L) |

Both MES and V-Tween-80 are categorized as "Aqueous Soluble Organics" and therefore their gram weights are added together (4.07 g/L MES+1.1 g/L Tween=5.17 g/L or ≧4 g/L of Aqueous Soluble Organics in the Concentration Dependent Multiplier). Acme calls for bringing the pH of the solution to pH 6.0 with 2.0 mL/L of concentrated HCl, therefore, an Acid component is also accounted for in the Matrix. The Matrix, with highlighted cells showing the place of each component on the table, is shown in Table 6; the final semi-quantitation value is B+20.

TABLE 6

Challenge Soil/Semi-Quantitation Matrix for Hypothetical Buffer XYZ
Challenge Soil Semi-Quantitation Matrix

| Component Factor | Possible Component Categories | Concentration Dependent Multiplier 0 | 1 | 2 | 3 | 4 | 5 | |
|---|---|---|---|---|---|---|---|---|
| CM | Complete Media | see additional components only for remaining criteria | | | | | | |
| B | Buffers and Non Medias | see additional components only for remaining criteria | | | | | | B |
| 1 | pH | 6.5-7.5 | >7.5-≦9 & <6.5-≧5 | <5-≧4 & >9-≦10 | <4-≧3 & >10-≦11 | <3-≧2 & >11-≦12 | <2 or >12 | 1 |
| | Composition and Concentration | | | | | | | |
| 2 | Acids or Bases | none | >0 g/L | ≧4 g/L | ≧20 g/L | ≧100 g/L | ≧500 g/L | 2 |
| 2 | Monovalent Salts | none | >0 g/L | ≧4 g/L | ≧20 g/L | ≧100 g/L | ≧500 g/L | 6 |
| 3 | Divalent Salts | none | >0 g/L | ≧4 g/L | ≧20 g/L | ≧100 g/L | ≧500 g/L | 3 |
| 2 | Amino Acids | none | >0 g/L | ≧2.5 g/L | ≧5 g/L | ≧10 g/L | ≧20 g/L | 4 |
| 3 | Protein | none | >0 g/L | ≧2.5 g/L | ≧5 g/L | ≧10 g/L | ≧20 g/L | 0 |
| 3 | Carbohydrates (%) | none | >0 g/L | ≧4 g/L | ≧20 g/L | ≧100 g/L | ≧500 g/L | 0 |
| 2 | Aqueous Soluble Organics | none | >0 g/L | ≧4 g/L | ≧20 g/L | ≧100 g/L | ≧500 g/L | 4 |
| 4 | Non Aqueous Soluble Organics | none | >0 g/L | ≧2.5 g/L | ≧5 g/L | ≧10 g/L | ≧20 g/L | 0 |
| | | | | | | | TOTAL | B + 20 |

Example 4

Tables 7 and 8 provide examples of the Total Matrix Values for the buffers used in providing two products, A and B. The solutions have been listed in order of highest to lowest Total Matrix Values. Table 7 demonstrates a listing of six buffers with one buffer having a matrix value clearly higher than the rest.

TABLE 7

Product A Buffers and Their Total Matrix Values

| FR# | Product A Buffer Working Title | Total Matrix Value |
|---|---|---|
| 0123 | 0.08 M Imidazole, 0.16 M $MgCl_2$, 4.0 M NaCl, 0.8% V-Polysorbate-80 | 25 |
| 0234 | 500 mL/L Polyethylene Glycol, 0.25 M NaCl, 0.020 M MgCl2, 0.020 M Valine, 0.01% V-Polysorbate-80 | 23 |
| 0345 | 0.02 M HEPES, 0.02 M MgCl2, 1 M NaCl, 0.1% V-Polysorbate-80 (Tank Version) | 15 |
| 0456 | 0.050 M Tris, 0.005 M $MgCl_2$, 0.1% W-Polysorbate-80 (w/w version) | 7 |
| 0567 | 0.05 M. Glycine | 6 |
| 0678 | 0.1 N NaOH Solution (Variable Volume) | 4 |

Table 7 shows that it is not always the solution with the greatest number of components that should be considered the worst case challenge solution. Sometimes solutions with a lower number of components may contain more extreme solute concentrations.

Table 8 presents various buffer solutions used in production of a Product B. Although several of the solutions contain high concentration solutes, the solution that produced the highest Total Matrix Value only had two components, one a highly hydrophobic (non-aqueous) agent that could provide a challenge for an aqueous-based cleaning regimen.

TABLE 8

Product B Buffers and Their Total Matrix Values

| MFR# | Product B Buffer Working Title | Total Matrix Value |
|---|---|---|
| 00023 | 15% Calcium Hydroxide, 1.8% Non Aqueous Antifoam | 24 |
| 00034 | 3.0 M Hydroxylamine-HCl, 0.3 M Tris, pH 9.70 | 18 |
| 00045 | 2.0 N NaOH, 4.0 M NaCl | 18 |
| 00056 | 260 mM Tris, pH 7.40 | 6 |
| 00067 | 80 mM Tris, pH 8.00 | 5 |
| 00078 | 20 mM Tris, pH 8.00 | 3 |

Table 8 shows that some solutions are deceivingly simple in component composition number but that the chemical nature of the given components is of extreme importance. The semi-quantitative matrix analysis approach suggests that the buffer and culture media solution with the highest Total Matrix Value should be considered the most difficult to clean from production equipment and therefore be considered the worst case challenge soil for use in cleanability studies or CIP performance qualifications (PQs).

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An apparatus for testing a cleaning procedure for a material, comprising:

a rack having a seat configured to retain a plurality of test coupons at a predetermined angle;

an upper tray that distributes a solution along the length of the rack;

a reservoir from which the solution is delivered to the upper tray;

a lower tray for receiving solution passed over coupons disposed in the rack;

a meter that gauges a flow rate of the solution;

a thermostatic heater in thermal communication with the reservoir; and a variable speed pump that directs the solution from a reservoir to the upper tray, wherein the meter that gauges the flow rate of the solution is in line from the pump to the upper tray.

2. The apparatus of claim 1, wherein the pump is a centrifugal pump.

3. The apparatus of claim 1, wherein the predetermined angle is forty-five degrees.

4. The apparatus of claim 1, further comprising a plurality of reservoirs from which fluid is directed to the upper tray.

5. The apparatus of claim 1, wherein the reservoir is the lower tray.

6. The apparatus of claim 1, wherein the rack is adjustable to accommodate coupons of different heights.

7. The apparatus of claim 1, wherein the apparatus is configured such that test coupons retained on the rack are directly observable such that the cleaning procedure can be observed in real time.

8. A method of testing a cleaning procedure, comprising:

directing a first fluid at a predetermined temperature and flow rate over a plurality of test coupons simultaneously;

recirculating the first fluid over the test coupons a predetermined number of times; and determining whether one or more of the plurality of test coupons is clean;

wherein the cleaning procedure is tested on a worst case soil selected from a plurality of predetermined soils by a method comprising:

for each of the predetermined soils, identifying the chemical nature and concentration or each component;

assigning a value to each component describing its cleanability; and comparing the sum of the values for each soil, wherein the soil having the highest sum is denoted the worst case soil;

the method further comprising classifying soils as buffers or media, wherein the buffer having the highest sum is denoted the worst case buffer soil, and the media having the highest sum is denoted the worst case media.

9. The method of claim 8, further comprising:

directing a second fluid at a predetermined temperature and flow rate over the plurality of test coupons simultaneously; and recirculating the second fluid over the test coupons a predetermined number of times.

10. The method of claim 8, further comprising disposing the plurality of test coupons at a predetermined angle with respect to an incident fluid flow.

11. The method of claim 10, wherein the predetermined angle is about forty-five degrees.

12. The method of claim 8, wherein the flow rate is between about 10 and about 50 lpm.

13. The method of claim 8, wherein the predetermined temperature is between ambient temperature and about sixty degrees Celsius.

14. The method of claim 8, wherein the value is an integer.

15. The method of claim 8, wherein assigning a value to each component comprises:

assigning a component factor to each component; and multiplying the component factor by a predetermined multiplier based on the concentration of the component in the soil.

16. The method of claim 15, wherein the multiplier is an integer.

17. The method of claim 8, further comprising assigning a value to the soil based on its pH.

18. The method of claim 17, wherein the value is an integer.

19. The method of claim 8, wherein the step of determining whether one or more of the plurality of test coupons is clean comprises subjecting the one or more test coupons to visual inspection.

20. The method of claim 8, wherein the step of determining whether one or more of the plurality of test coupons is clean comprises subjecting the one or more test coupons to Total Organic Carbon analysis.

21. The method of claim 8, wherein the step of determining whether one or more of the plurality of test coupons is clean comprises subjecting the one or more test coupons to conductivity analysis.

22. A method of testing a cleaning procedure, comprising:

directing a first fluid at a predetermined temperature and flow rate over a plurality of test coupons simultaneously;

recirculating the first fluid over the test coupons a predetermined number of times; and determining whether one or more of the plurality of test coupons is clean;

wherein the cleaning procedure is tested on a worst case soil selected from a plurality of predetermined soils by a method comprising:

for each of the predetermined soils, identifying the chemical nature and concentration of each component;

assigning a value to each component describing its cleanability; and comparing the sum of the values for each soil, wherein the soil having the highest sum is denoted the worst case soil;

the method further comprising classifying each component as one of acid, base, monovalent salt, divalent salt, amino acid, protein, carbohydrate, aqueous soluble organic, or non-aqueous soluble organic.

23. The method of claim 22, further comprising:

directing a second fluid at a predetermined temperature and flow rate over the plurality of test coupons simultaneously; and recirculating the second fluid over the test coupons a predetermined number of times.

24. The method of claim 22 further comprising disposing the plurality of test coupons at a predetermined angle with respect to an incident fluid flow.

25. The method of claim 24, wherein the predetermined angle is about forty-five degrees.

26. The method of claim 22, wherein the flow rate is between about 10 and about 50 lpm.

27. The method of claim 22, wherein the predetermined temperature is between ambient temperature and about sixty degrees Celsius.

28. The method of claim 22, wherein the value is an integer.

29. The method of claim 22, wherein assigning a value to each component comprises:

assigning a component factor to each component; and multiplying the component factor by a predetermined multiplier based on the concentration of the component in the soil.

30. The method of claim 29, wherein the multiplier is an integer.

31. The method of claim 22, further comprising assigning a value to the soil based on its pH.

32. The method of claim 31, wherein the value is an integer.

33. The method of claim 22, wherein the step of determining whether one or more of the plurality of test coupons is clean comprises subjecting the one or more test coupons to visual inspection.

34. The method of claim 22, wherein the step of determining whether one or more of the plurality of test coupons is clean comprises subjecting the one or more test coupons to Total Organic Carbon analysis.

35. The method of claim 22, wherein the step of determining whether one or more of the plurality of test coupons is clean comprises subjecting the one or more test coupons to conductivity analysis.

* * * * *